United States Patent [19]
Moedinger

[11] Patent Number: 5,613,572
[45] Date of Patent: Mar. 25, 1997

[54] MOTOR VEHICLE RACK STEERING SYSTEM

[75] Inventor: Wolfgang Moedinger, Weinstadt, Germany

[73] Assignee: Mercedes-Benz AG, Germany

[21] Appl. No.: 609,896

[22] Filed: Mar. 4, 1996

Related U.S. Application Data

[63] Continuation of Ser. No. 328,676, Oct. 25, 1994, abandoned.

[30] Foreign Application Priority Data

Oct. 25, 1993 [DE] Germany ............ 43 36 286.9

[51] Int. Cl.⁶ ............................................. B62D 3/12
[52] U.S. Cl. .................. 180/400; 180/447; 280/95.1; 280/846; 74/496
[58] Field of Search ............... 180/79.3, 79, 151, 180/154, 400, 428, 434, 435, 437, 440, 447; 280/95.1, 846, 96, 93; 74/422, 496, 498, 89.17

[56] References Cited

U.S. PATENT DOCUMENTS

| | | | |
|---|---|---|---|
| 2,223,274 | 11/1940 | Tait | 280/95.1 X |
| 3,075,784 | 1/1963 | Beyerstedt | 280/95.1 X |
| 3,605,932 | 4/1969 | Wilfert et al. | 180/428 |
| 4,064,967 | 12/1977 | Doolittle | 180/435 |
| 4,657,271 | 4/1987 | Salmon | 280/95.1 |
| 4,928,984 | 5/1990 | Bauer | 280/95.1 |
| 5,082,077 | 1/1992 | Holka | 180/79.3 |

FOREIGN PATENT DOCUMENTS

| | | |
|---|---|---|
| 0134003 | 7/1987 | European Pat. Off. . |
| 0481622 | 4/1992 | European Pat. Off. . |
| 2591986 | 12/1985 | France . |
| 3434637A1 | 4/1986 | Germany . |

Primary Examiner—Brian L. Johnson
Assistant Examiner—Victor E. Johnson
Attorney, Agent, or Firm—Evenson, McKeown, Edwards & Lenahan, P.L.L.C.

[57] ABSTRACT

A rack steering system for motor vehicles has inner track rod joints which are offset transverse to the longitudinal axis of the rack. The inner track rod joints are arranged on separate deflection levers which are, in turn, drive-connected to a central tap-off connection of the rack by connecting struts.

19 Claims, 2 Drawing Sheets

MOTOR VEHICLE RACK STEERING SYSTEM

This application is a continuation of application Ser. No. 08/328,676, filed on Oct. 25, 1994, now abandoned.

BACKGROUND AND SUMMARY OF THE INVENTION

The present invention relates to a rack steering system for motor vehicles with a guide and support unit displaceably supporting the rack at its end sections and with inner (i.e. remote from the wheels) track rod joints offset transverse to the longitudinal axis of the rack. The track rod joints are arranged on the free ends of two deflection levers, which are arranged at both sides of the guide and support unit and are drive-connected to the rack. The deflection levers can be pivoted about support pins directed transverse to the longitudinal axis of the rack.

EP 04 81 622 A1 describes a rack steering system. The offset arrangement of the inner track rod joints relative to the longitudinal axis of the rack is necessary or advantageous if a rack steering system has to be arranged under restricted conditions, such as are typically present in the region of the front axle in present-day passenger cars, in particular where the vehicle engine extends in the longitudinal direction between the front wheels. In this case, the rack must usually be arranged under the oil sump or the bottom of the engine. As a rule, however, such a low-level arrangement of the inner track rod joints is not possible or desirable because the necessary free movement between the track rods and the transverse links of the front wheels is not available or the result is kinematically unfavorable positions of the track rods.

The known rack steering system described in EP 04 81 622 A1 provides for end pieces which are arranged on the rack and which are displaceably guided in associated end parts of the guide and support unit to engage, via trunnions or the like arranged thereon, in elongated holes of the deflection levers such that a drive connection configured in the manner of a sliding joint is formed between the rack and the deflection levers. Such a configuration is relatively complicated and offers only little freedom with respect to the arrangement of the deflection levers.

It is, therefore, an object of the present invention to provide a particularly useful construction for a rack steering system of the above-mentioned type.

This object has been achieved in accordance with the present invention in that the deflection levers are drive-connected to a central tap-off connection of the rack by connecting struts hinged at their free ends. The deflection levers can be arranged in various ways on the guide and support unit. It is, in particular, possible to arrange the deflection levers on the mutually facing sides of end holding features (e.g., flanges) for fastening the guide and support unit.

In accordance with one presently preferred embodiment of the invention, the central tap-off connection, the hinge points of the connecting struts on the central tap-off connection and the connecting joints between the connecting struts and the deflection levers can be fitted in a plane containing the longitudinal axis of the rack. Consequently, torques acting on the rack relative to its longitudinal axis are completely avoided. The rack steering system of the present invention thus correspondingly retains ease of movement without great complication in the rack support arrangements.

In a particularly advantageous embodiment of the present invention, the connecting struts are hinged on the central tap-off connection at a transverse distance from the longitudinal axis of the rack so that the virtual extensions of the connecting struts pass through rack supports arranged on both sides of the central tap-off connection on or in the guide and support unit near the longitudinal axis of the rack. This feature permits particularly low loading on the rack supports to be achieved.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
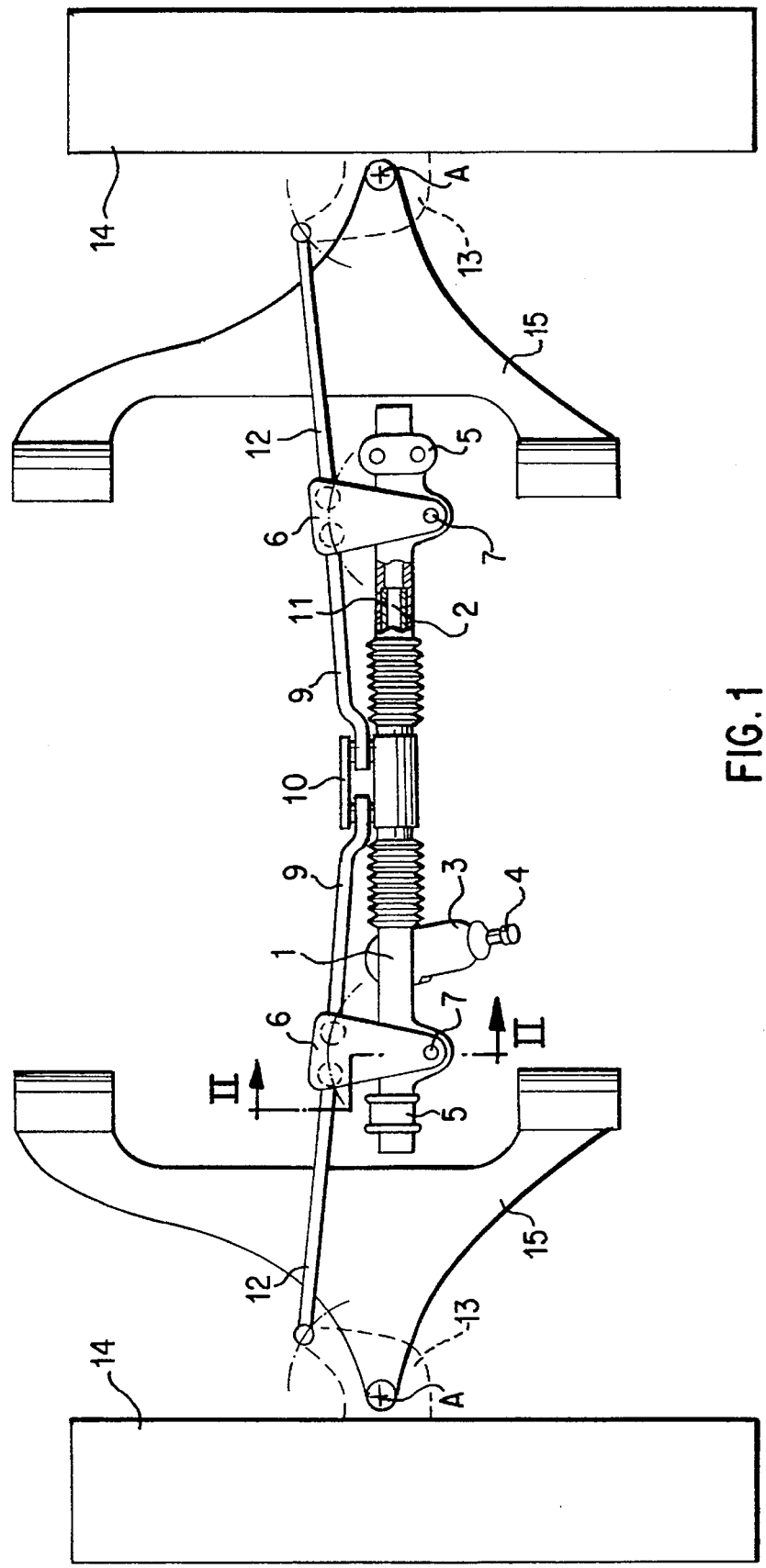
FIG. 1 is a partially schematic plan view onto the rack steering system.

In FIG. 1, the rack steering system is illustrated in the "straight-ahead" position. A rack 2 interacts in a fundamentally known manner with a pinion which is accommodated in the housing part 3 and can be driven by an input shaft 4. The rack 2 is arranged so that it can be displaced longitudinally in an essentially tubular support and guide unit 1. The support and guide unit 1 has, at its ends, flanges 5 or the like for fastening to the chassis, or parts connected to it, of the vehicle.

Figure 2:
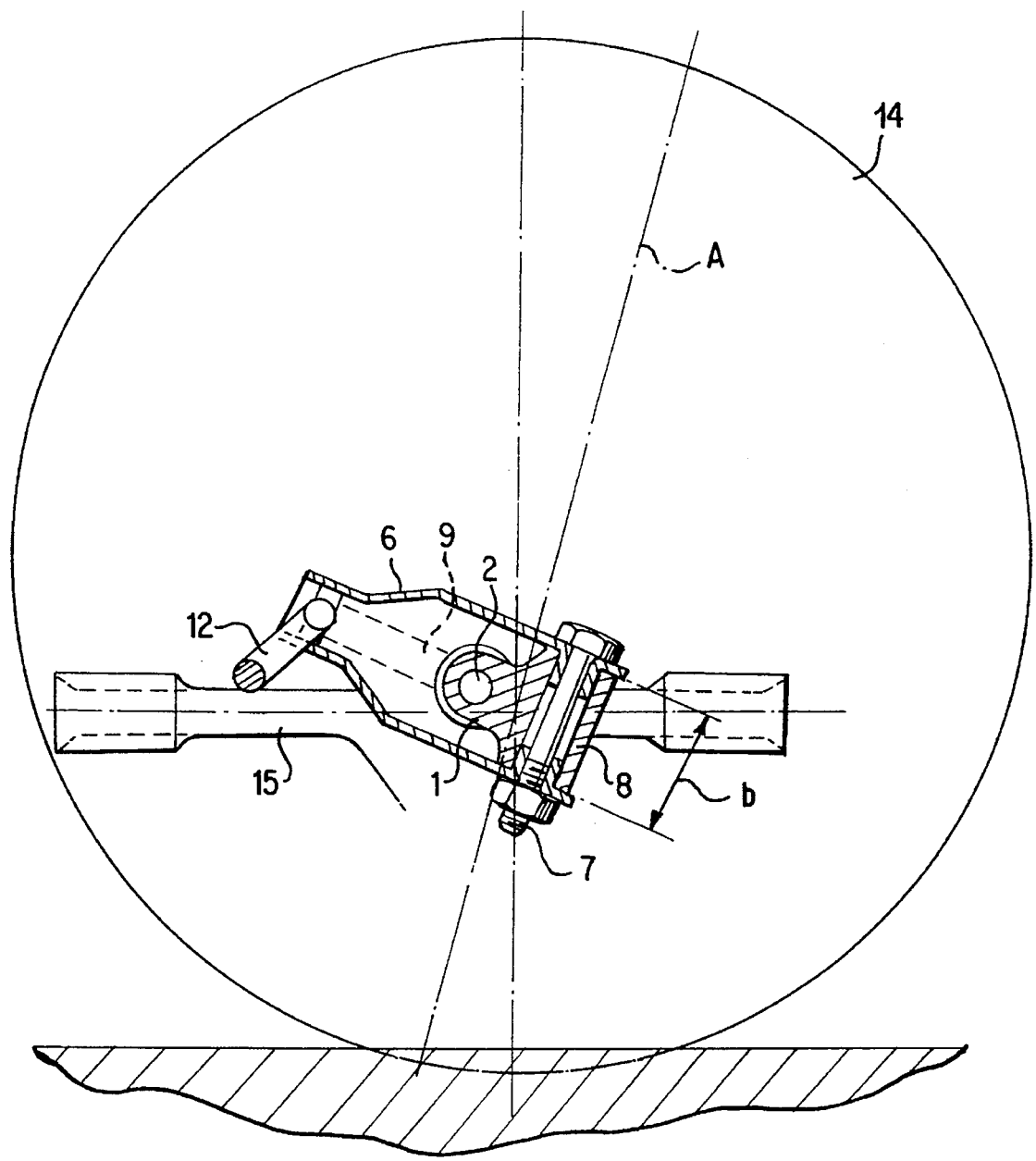
FIG. 2 shows a sectional view along line II—II of FIG. 1.

Near the support and guide unit flanges 5, on their mutually facing sides two deflection levers 6 are pivotally held by supporting bolts 7 on the support and guide unit 1. As seen in FIG. 2, the supporting bolts 7 are arranged in joint eyes 8 formed on the support and guide unit 1 at a transverse distance from the longitudinal axis of the rack 2. These joint eyes 8 have a relatively large axial length b, so that the deflection levers 6, which respectively encompass the support and guide unit 1 in a fork-like manner and are respectively hingedly supported on both ends of the joint eyes 8 by the supporting bolts 7, are offered a correspondingly wide support base.

The outer ends of connecting struts 9 are hinged on the free ends of the deflection levers 6 on the side of the rack 2, or of the support and guide unit 1, facing away from the supporting bolts 7. The other ends of the connecting struts 9 are hinge-connected to a central tap-off connection 10 of the rack 2. The deflection levers are therefore positively pivoted about the axes of their supporting bolts 7 when the rack 2 executes a longitudinal displacement.

The hinged connections of the connecting struts 9 to the central tap-off connection 10 and to the deflection levers 6 are arranged in a plane which contains the longitudinal axis of the rack 2. This arrangement prevents the connecting struts 9 from exerting a torque on the rack 2 relative to its longitudinal axis because of thrust and tensile forced transmitted thereby. Furthermore, the hinged connections of the connecting struts 9 to the central tap-off connection 10 and to the deflection levers 6 are arranged at such distances from the longitudinal axis of the rack 2 that the force lines of action of the connecting struts 9 pass, at small angles to the longitudinal axis of the rack 2, through support sections 11 arranged in the support and guide unit 1 to guide the rack 2.

Consequently, only a small amount of bearing friction can occur during displacement motions of the rack 2.

The inner ends of track rods 12 are hinged onto the free ends of the deflection levers 6 near the outer ends of the connecting struts 9, and the outer ends of track rods 12 are hinged-connected, in a conventionally known manner, to steering arms 13 by way of which the vehicle (front) steered wheels 14 are pivoted about essentially vertical axes A during steering maneuvers. The arrangement is then configured so that the steering arms 13 and the respectively associated deflection levers 6 form a steering quadrilateral acting in the same direction.

As is particularly shown in FIG. 2, oblique setting of the pivoting axes of the deflection levers 6, as determined by the supporting bolts 7, can achieve the result that even in the case of a low-level arrangement of the rack 2, the inner joints of the track rods 12, connected to the deflection levers 6 have a relatively high location. There is, correspondingly, a large amount of freedom with respect to prescribing the height location of the track rods 12 which additionally makes it relatively easy to ensure sufficient freedom between the track rods 12 and the transverse links 15 arranged thereunder for guiding the steered wheels 14.

Because of the wide support base b of the deflection levers 6 on the respective joint eyes 8, only relatively small support forces occur even when the track rods 12 execute relatively large angular motions relative to the plane of pivoting of the deflection levers 6 when the suspension of the steered wheels 14 deflects. In particular, suspension movements of the steering wheels 14 cannot exert any torque on the rack 2 relative to its longitudinal axis because the deflection levers 6 are fitted between the track rods 12 and the connecting struts 9.

Despite its ease of movement, the rack steering system according to the present invention has little sensitivity to shock because the steered wheels 14 are effectively disconnected from the rack 2, and therefore also from the steering wheel (not shown), because of the hinged connections of the deflection levers 6 with the connecting struts 9 and the track rods 12.

The ability to arrange the track rods 12 at a high level even in the case of a low-level arrangement of the rack 2 offers the significant advantage that relatively long steering arms 13 can be arranged to reduce the rod forces to be transmitted by the track rods 12 and the connecting struts 9.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A rack steering system for a motor vehicle having steered wheels, comprising a rack having a longitudinal axis transverse to a longitudinal direction of the motor vehicle and a central tap-off connection, a guide and support unit having support sections displaceably supporting the rack at end sections thereof, deflection levers having free ends and other ends pivotable about support pins arranged laterally of and on the guide and support unit and oriented transverse to the longitudinal direction of the rack, track rods with inner track rod joints remote from the steered wheels of the motor vehicle arranged transversely offset to the longitudinal axis of the rack on the free ends of the deflection levers, and connecting struts hingedly connecting the free ends of the deflection levers to the central tap-off connection, wherein the connecting struts and associated track rods are arranged at the same free end of the deflection levers above the respective support pins the support sections being disposed laterally of the central tap-off connection, and the connecting struts have a hinged connection at the central tap-off connection at a transverse distance from the longitudinal axis of the rack such that lines of action of rod forces of the connecting struts pass through the support sections.

2. The rack steering system according to claim 1, wherein the support pins of the deflection levers and the hinged connection of the deflection levers with the connecting struts and the track rods are arranged on opposite sides of the longitudinal axis of the rack.

3. The rack steering system according to claim 2, wherein the rack has rack supports disposed laterally of the central tap-off connection, and the connecting struts have the hinged connection at the central tap-off connection at a transverse distance from the longitudinal axis of the rack such that lines of action of rod forces of the connecting struts pass through the rack supports.

4. The rack steering system according to claim 1, wherein the hinged connection between the connecting struts and the central tap-off connection and between the connecting struts and the deflection levers are in a plane containing the longitudinal axis of the rack.

5. The rack steering system according to claim 4, wherein the rack has rack supports disposed laterally of the central tap-off connection, and the connecting struts having the hinged connection at the central tap-off connection at a transverse distance from the longitudinal axis of the rack such that lines of action of rod forces of the connecting struts pass through the rack supports.

6. The rack steering system according to claim 5, wherein the support pins of the deflection levers and the hinged connection of the deflection levers with the connecting struts and the track rods are arranged on opposite sides of the longitudinal axis of the rack.

7. The rack steering system according to claim 1, wherein the steered wheels have an axis extending transverse to the longitudinal direction of the motor vehicle and, as viewed in a forward travelling direction of the motor vehicle, the track rods are arranged forward of centers of the steered wheels.

8. The rack steering system according to claim 7, wherein the rack has rack supports disposed laterally of the central tap-off connection, and the connecting struts having the hinged connection at the central tap-off connection at a transverse distance from the longitudinal axis of the rack such that lines of action of rod forces of the connecting struts pass through the rack supports.

9. The rack steering system according to claim 8, wherein the support pins of the deflection levers and the hinged connection of the deflection levers with the connecting struts and the track rods are arranged on opposite sides of the longitudinal axis of the rack.

10. The rack steering system according to claim 9, wherein the hinged connections between the deflection levers and the connecting struts and between the deflection levers and the track rods are spaced from one another in a peripheral direction in relation to the support pin.

11. The rack steering system according to claim 10, wherein the hinged connection between the connecting struts and the central tap-off connection and between the connecting struts and the deflection levers are in a plane containing the longitudinal axis of the rack.

12. The rack steering system according to claim 1, wherein the steered wheels have an axis extending transverse to the longitudinal direction of the motor vehicle and, as viewed in a forward travelling direction of the motor vehicle, the track rods are arranged rearwardly of centers of the steered wheels.

13. The rack steering system according to claim 1, wherein steering arms are positively connected with the deflection levers via the track rods, and the steering arms and the deflection levers are arranged laterally of the vehicle wheels.

14. The rack steering system according to claim 13, wherein the rack has rack supports disposed laterally of the central tap-off connection, and the connecting struts having the hinged connection at the central tap-off connection at a transverse distance from the longitudinal axis of the rack such that lines of action of rod forces of the connecting struts pass through the rack supports.

15. The rack steering system according to claim 14, wherein the support pins of the deflection levers and the hinged connections of the deflection levers with the connecting struts and the track rods are arranged on opposite sides of the longitudinal axis of the rack.

16. The rack steering system according to claim 1, wherein steering arms are positively connected with the deflection levers via the track rods, and the steering arms and the deflection levers are arranged laterally of the vehicle wheels.

17. The rack steering system according to claim 13, wherein the rack has rack supports disposed laterally of the central tap-off connection, and the connecting struts having the hinged connection at the central tap-off connection at a transverse distance from the longitudinal axis of the rack such that lines of action of rod forces of the connecting struts pass through the rack supports.

18. A rack steering system for a motor vehicle having steered wheel, comprising a rack having a longitudinal axis transverse to a longitudinal direction of the motor vehicle and a central tap-off connection, a guide and support unit displaceably supporting therein the rack at the end sections thereof, deflection levers having free ends and other ends pivotable about support pins arranged laterally of and on the guide and support unit and oriented transverse to the longitudinal direction of the rack, track rods with inner track rod joints remote from the steered wheels of the motor vehicle arranged transversely offset to the longitudinal axis of the rack on the free ends of the deflection levers, and hinged connections comprising connecting struts for hingedly connecting the free ends of the deflection levers to the central tap-off connection, wherein the connecting struts and associated track rods are arranged at the same free end of the deflection levers above the respective support pins, the support pins of the deflection levers and the hinged connection are arranged on opposite sides of the longitudinal axis of the rack, and the hinged connection between the deflection levers and the connecting struts and between the deflection levers and the track rods are spaced from one another in a peripheral direction in relation to the support pin.

19. A rack steering system for a motor vehicle having steered wheels, comprising a rack having a longitudinal axis transverse to a longitudinal direction of the motor vehicle and a central tap-off connection, a guide and support unit displaceably supporting therein the rack at the end sections thereof, deflection levers having free ends and other ends pivotable about support pins arranged laterally of and on the guide and support unit and oriented transverse to the longitudinal direction of the rack, track rods with inner track rod joints remote from the steered wheels of the motor vehicle arranged transversely offset to the longitudinal axis of the rack on the free ends of the deflection levers, and hinged connections comprising connecting struts for hingedly connecting the free ends of the deflection levers to the central tap-off connection, wherein the hinged connections between the connecting struts and the central tap-off connection and hinged connections between the connecting struts and the deflecting levers are in a plane containing the longitudinal axis of the rack, wherein the rack has rack supports disposed laterally of the central tap-off connection, and the hinged connections between the connecting struts and the central tap-off connection located at a transverse distance from the longitudinal axis of the rack such that lines of action of rod forces of the connecting struts pass through the rack supports, the support pins of the deflection levers, and the hinged connections of the deflection levers with the connecting struts and the hinged connections between the deflection levers and the track rods are arranged on opposite sides of the longitudinal axis of the rack, and the hinged connections between the deflection levers and the track rods are spaced from one another in a peripheral direction in relation to the support pin.

* * * * *